(12) United States Patent
Bertens et al.

(10) Patent No.: US 8,050,513 B2
(45) Date of Patent: Nov. 1, 2011

(54) METHOD OF GENERATING MULTISCALE CONTRAST ENHANCED IMAGE

(75) Inventors: Tom Bertens, Mechelen (BE); Pieter Vuylsteke, Mortsel (BE)

(73) Assignee: Agfa HealthCare N.V., Mortsel (BE)

( * ) Notice: Subject to any disclaimer, the term of this patent is extended or adjusted under 35 U.S.C. 154(b) by 944 days.

(21) Appl. No.: 11/933,834

(22) Filed: Nov. 1, 2007

(65) Prior Publication Data

US 2008/0137977 A1 Jun. 12, 2008

Related U.S. Application Data

(60) Provisional application No. 60/870,024, filed on Dec. 14, 2006.

(30) Foreign Application Priority Data

Dec. 11, 2006 (EP) .................................. 06125766

(51) Int. Cl.
*G06K 9/40* (2006.01)
*G06K 9/00* (2006.01)
(52) U.S. Cl. .................. 382/274; 382/254; 382/131
(58) Field of Classification Search .................. 382/274, 382/254, 100, 130, 131, 132, 162, 166, 260, 382/263, 275, 284, 298
See application file for complete search history.

(56) References Cited

U.S. PATENT DOCUMENTS

| 5,799,100 A | * | 8/1998 | Clarke et al. | .................. 382/132 |
| 6,285,798 B1 | * | 9/2001 | Lee | ................. 382/260 |
| 6,310,967 B1 | * | 10/2001 | Heine et al. | .................. 382/128 |
| 6,593,941 B1 | * | 7/2003 | Sameshima | .................. 715/716 |
| 6,731,790 B1 | | 5/2004 | Van de Velde et al. | |
| 6,788,826 B1 | | 9/2004 | Van de Velde et al. | |

FOREIGN PATENT DOCUMENTS

EP 0 527 525 A2 2/1993

OTHER PUBLICATIONS

Lu, J., et al., "Contrast Enhancement via Multiscale Gradient Transformation," Proceedings of the International Conference on Image Processing (ICIP), Austin, IEEE Comp. Soc. Press, vol. 3, Conf. 1, pp. 482-486, 1994.

Mallat, S., "A Theory for Multiresolution Signal Decomposition: The Wavelet Representation," IEEE Transactions on Pattern Analysis and Machine Intelligence, vol. 11, No. 7, pp. 674-693, Jul. 1989.

Vuylsteke P., et al., "Image Processing in Computer Radiography," Computerized Tomography for Industrial Applications and Image Processing Radiology, pp. 87-101, Mar. 1999.

European Search Report from EP06125766, filed on Dec. 11, 2006.

* cited by examiner

*Primary Examiner* — Yon Couso
(74) *Attorney, Agent, or Firm* — Houston Eliseeva, LLP (57) ABSTRACT

A method of generating a multiscale contrast enhanced image preserving the shape of the edge transitions is described. Enhanced detail pixel values are computed by combining enhanced center difference images at least one scale.

20 Claims, 11 Drawing Sheets

---

1st embodiment

Pixel value in detail image $d_k(i,j)$ can be computed as center difference $c_k(i,j)$
$d_k(i,j) = c_k(i,j) = \Sigma\, w_{s,t} * (\, g_k(i,j) - g_k(i+s,j+t)\,)$ $m_k(i,j) = \Sigma\, w_{s,t} * f(g_k(i,j) - g_k(i+s,j+t))$ with f a conversion operator Enhanced pixel value in detail image $m_k(i,j)$ 2nd embodiment Pixel value in detail image $d_k(i,j)$ $a_k(i,j) = (\Sigma\, \hat{w}_{s,t} * f(g_k(i,j) - g_k(i+s,j+t))) / (\Sigma\, \hat{w}_{s,t} * (g_k(i,j) - g_k(i+s,j+t)))$
with f a conversion operator $m_k(i,j) = a_k(i,j) * d_k(i,j)$ Enhanced pixel value in detail image $m_k(i,j)$

1st embodiment

Pixel value in detail image $d_k(i,j)$ can be computed as center difference $c_k(i,j)$
$$d_k(i,j) = c_k(i,j) = \Sigma\, w_{s,t} * (g_k(i,j) - g_k(i+s, j+t))$$

$m_k(i,j) = \Sigma\, w_{s,t} * f(g_k(i,j) - g_k(i+s, j+t))$ with f a conversion operator Enhanced pixel value in detail image $m_k(i,j)$

2nd embodiment

Pixel value in detail image $d_k(i,j)$ $a_k(i,j) = (\Sigma\, \hat{w}_{s,t} * f(g_k(i,j) - g_k(i+s, j+t))) / (\Sigma\, \hat{w}_{s,t} * (g_k(i,j) - g_k(i+s, j+t)))$
with f a conversion operator $m_k(i,j) = a_k(i,j) * d_k(i,j)$ Enhanced pixel value in detail image $m_k(i,j)$

$LUT_k(d) = f_k(d)$ $f_k(d)$ is the amplification of local contrast $d$ at scale $k$

$LUT_k(d) = f_k(d)$ $f_k(d)$ is the amplification of local contrast $d$ at scale $k$

$LUT_k(d) = f_k(d)$ $f_k(d)$ is the amplification of local contrast $d$ at scale $k$

$LUT_k(d) = f_k(d)$ $f_k(d)$ is the amplification of local contrast $d$ at scale $k$

METHOD OF GENERATING MULTISCALE CONTRAST ENHANCED IMAGE

RELATED APPLICATIONS

This application claims priority to European Patent Application No. 06125766.3, filed on Dec. 11, 2006, and claims the benefit under 35 USC 119(e) of U.S. Provisional Application No. 60/870,024, filed on Dec. 14, 2006, and is related to U.S. application Ser. No. 11/933,857, filed on Nov. 1, 2007, entitled, "Method of Generating Multiscale Contrast Enhanced Image," by Tom Bertens and Pieter Vuylsteke, all three of which are incorporated herein by reference in their entirety.

BACKGROUND OF THE INVENTION

Commonly, images represented by a digital signal such as medical images are subjected to image processing during or prior to display or hard copy recording.

The conversion of grey value pixels into values suitable for reproduction or displaying may comprise a multi-scale image processing method (also called multi-resolution image processing method) by means of which the contrast of the image is enhanced.

Figure 2:
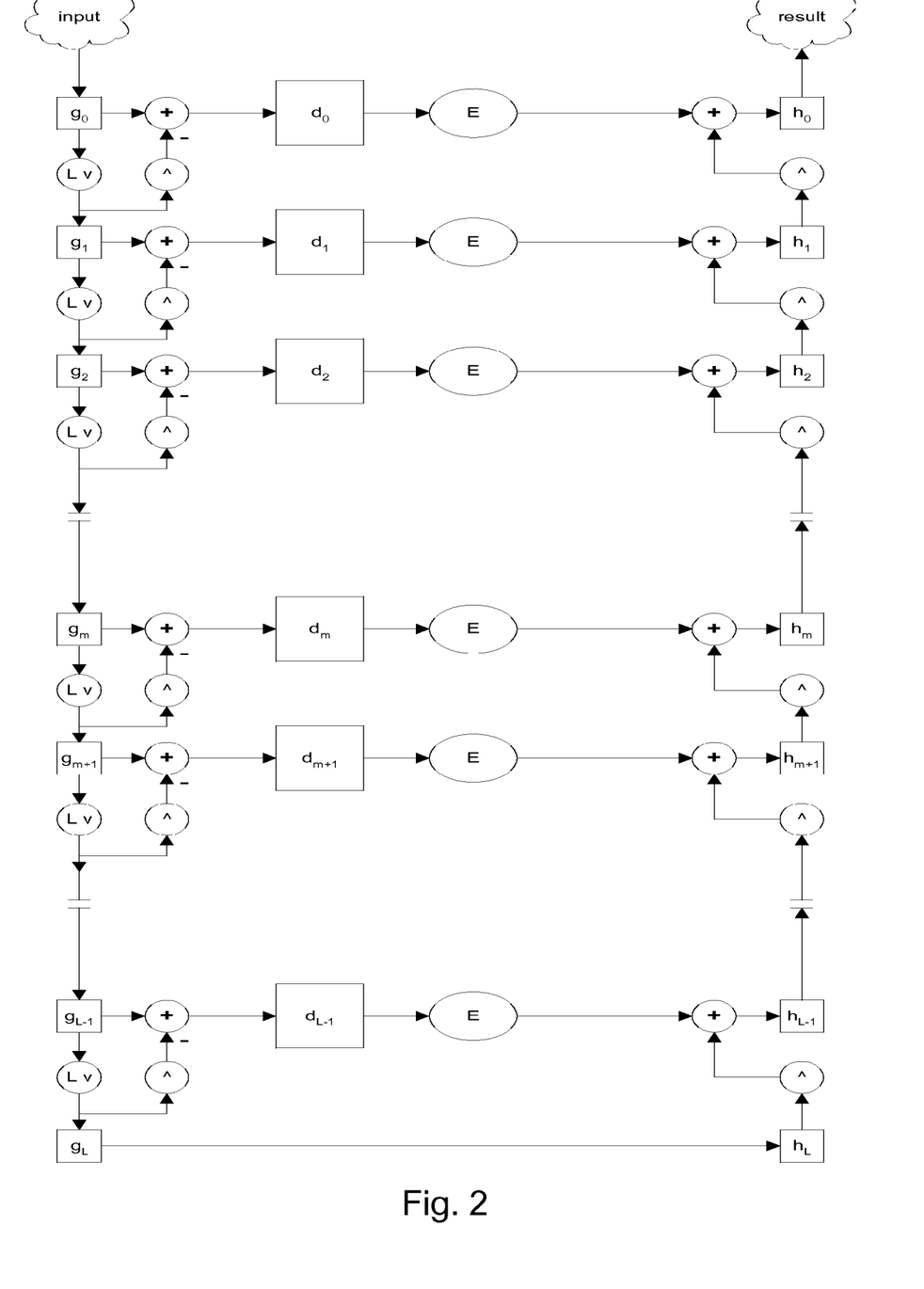
FIG. 2 illustrates a multi-resolution image processing method according to the prior art.
Figure 3:
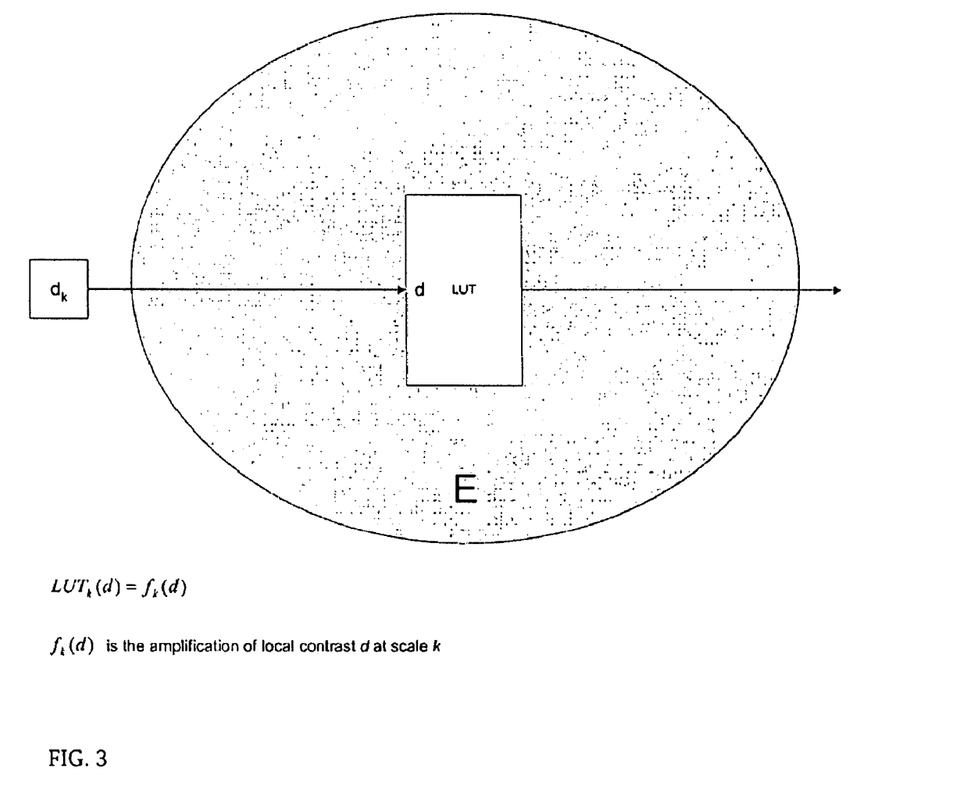
FIG. 3 illustrates the image enhancement step of the multi-resolution image processing method illustrated in FIG. 2, FIGS. 4, 6 and 8 illustrate different implementations of the multi-resolution image processing method according to the present invention.

According to such a multi-scale image processing method an image, represented by an array of pixel values, is processed by applying the following steps. First the original image is decomposed into a sequence of detail images at multiple scales and occasionally a residual image. Next, the pixel values of the detail images are modified by applying to these pixel values at least one conversion. Finally, a processed image is computed by applying a reconstruction algorithm to the residual image and the modified detail images. Such a method is illustrated in FIGS. 2 and 3.

There are limits for the behavior of the conversion functions. Grey value transitions in the image can be distorted to an extent that the appearance becomes unnatural if the conversion functions are excessively non-linear. The distortions are more pronounced in the vicinity of significant grey level transitions, which may result in overshoots at step edges and loss of homogeneity in regions of low variance facing strong step edges. The risk of creating artifacts becomes more significant for CT images since they have sharper grey level transitions, e.g. at the interface of soft tissue and contrast media. One has to be careful using the multi-scale techniques on CT images.

In U.S. Pat. No. 6,731,790 B1 a method is described in which artifacts are corrected in an image that is represented by a digital signal. The corrected artifacts originate from any kind of non-linear modification of the components of a multi-scale image representation.

A gradient representation of the original image is generated and modified. A modification step is applied to gradient images.

A reconstruction process is applied to the modified gradient representation.

SUMMARY OF THE INVENTION

The present invention relates to a method for enhancing the contrast of an image that is represented by a digital signal and provide a method that overcomes the prior art inconveniences.

More specifically it is an object of the present invention to provide a new multi-scale contrast enhancement algorithm which results in a contrast enhanced image while preserving the shape of the edge transitions.

The invention provides that enhanced detail pixel values are created by enhancement of the center differences.

The implementations of the method of the present invention are different from the prior art multi-scale contrast enhancement for the following reason: the prior art algorithms amplify the detail pixel values by applying the conversion functions directly to the detail pixel values by means of look up tables or multiplicative amplification factors.

The present invention is applicable to all the multi-scale detail representation methods from which the original image can be computed by applying the inverse transform.

The invention is applicable to all the multi-scale decomposition methods wherein the detail pixels are equivalent to the sum of translation difference images or can be computed as a center difference image.

According to the present invention enhanced detail pixel values are directly computed by combining the enhanced center differences at least one scale.

In general, according to one aspect, the invention features a method of enhancing the contrast of an image that is represented by a digital signal. The method comprises creating at least one approximation image at one or multiple scales, an approximation image at a scale representing the grey values of said image in which all details at that scale have been omitted, creating translation difference images by pixel-wise subtracting the values of an approximation image at scale s and the values of a translated version of the approximation image, non-linearly modifying the values of said translation difference image; computing at least one enhanced center difference image at a specific scale by combining said modified translation difference images at that scale or a smaller scale with weights $w_{i,j}$ in which said weights $w_{i,j}$ are selected such that, if no enhancement is performed, an equivalent of a multi-scale decomposition of said image is obtained; and computing an enhanced image by applying a reconstruction algorithm to the enhanced center difference images.

In preferred embodiments, a translation difference image is computed at a specific scale out of an approximation image at the same scale. Also, all of said translation difference images are computed out of the original image.

In some cases, a translation difference image at a scale k is computed out of an approximation image at scale m, wherein m represents a scale between scale 1 and scale k−1.

The center difference images are sometimes identical to the multi-scale detail images.

In examples, image is a mammographic image and/or a CT (computed tomography) image.

According to other aspects, the invention relates to a computer software product for enhancing the contrast of an image that is represented by a digital signal. The product comprises a computer-readable medium in which program instructions are stored, which instructions, when read by a computer, cause the computer to perform the method.

According to other aspects, the invention relates to computer software for enhancing the contrast of an image that is represented by a digital signal, which software, when executed by a computer, causes the computer to perform the method.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

In the context of this description of the present invention, specific terms are defined as follows:

Multi-scale decomposition mechanism: A multi-scale (or multi-resolution) decomposition of an image is a process that computes detail images of said image at multiple scales of a grey value image. A multi-scale decomposition mechanism generally involves filter banks for computing the detail images. Well-known techniques are for example: the Laplacian pyramid, the Burt pyramid, the Laplacian stack, the wavelet decomposition, QMF filter banks.

Approximation image: An approximation image is a grey value image that represents the original grey value image at the same or a larger scale, or at the same or a lower resolution. An approximation image at a specific scale is equivalent to the original grey value image in which all details at that scale have been omitted (Mallat S. G., "A Theory for Multiresolution Signal Decomposition: The Wavelet Representation", IEEE Trans. On Pattern Analysis and Machine Intelligence, vol. 11, no. 7, July 1989).

Detail image: A detail image is defined as the difference of information between an approximation image at a certain scale and an approximation image at a smaller scale.

Conversion operator: A conversion operator is operator which generates the pixel-wise modification of the detail pixel values as an intermediate step to create a contrast enhanced version of the grey value image. Such an operator has for example been described in European patent EP 527 525. The modification is defined by a conversion function and can e.g. be implemented as a look up table or as a multiplicative amplification.

Translation difference image: The translation difference images at a scale s are a measurement of elementary contrast in each pixel of an approximation image at scale s. They can be computed by taking the difference of the approximation image at that scale s and a translated version. Other computations for elementary contrast are possible, e.g. the ratio of pixel with a neighboring pixel can be used in case the processing steps are preceded by an exponential transform and followed by a logarithmic transform.

Center difference image: A center difference image is computed by applying a combining operator (for example the summation) to translation difference images.

The combining operator can be a linear or non-linear function of corresponding pixel values in the translation difference images.

This contrast enhancement algorithm is applicable to all multi-scale detail representation methods from which the original image can be computed by applying the inverse transformation.

Figure 4:
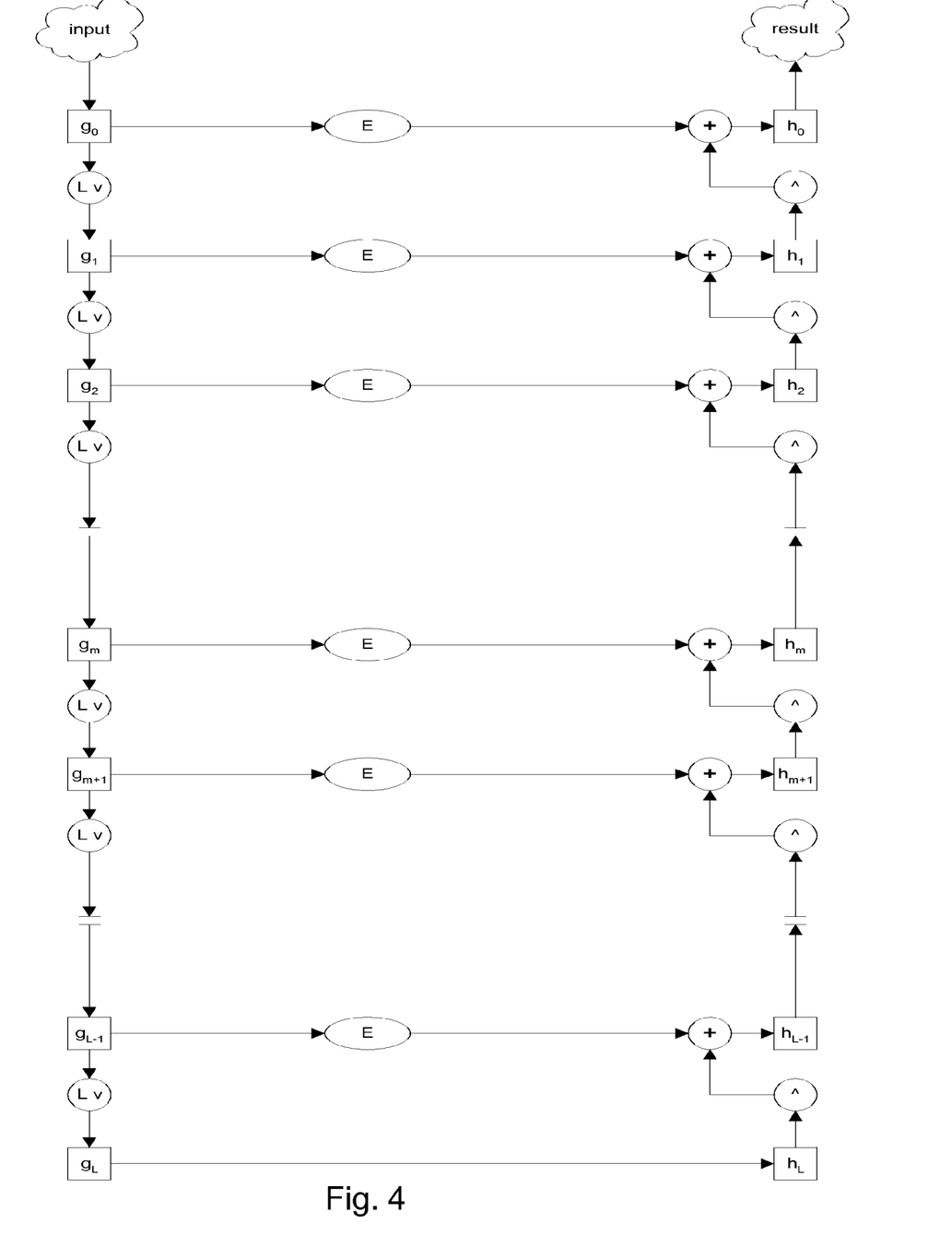

According to the embodiments of the present invention enhanced detail pixel values are directly computed by combining the enhanced center differences at least one scale. This is illustrated in FIGS. 4, 6 and 8 with corresponding enhancement steps being illustrated in FIGS. 5, 7 and 9 respectively).

Figure 1:
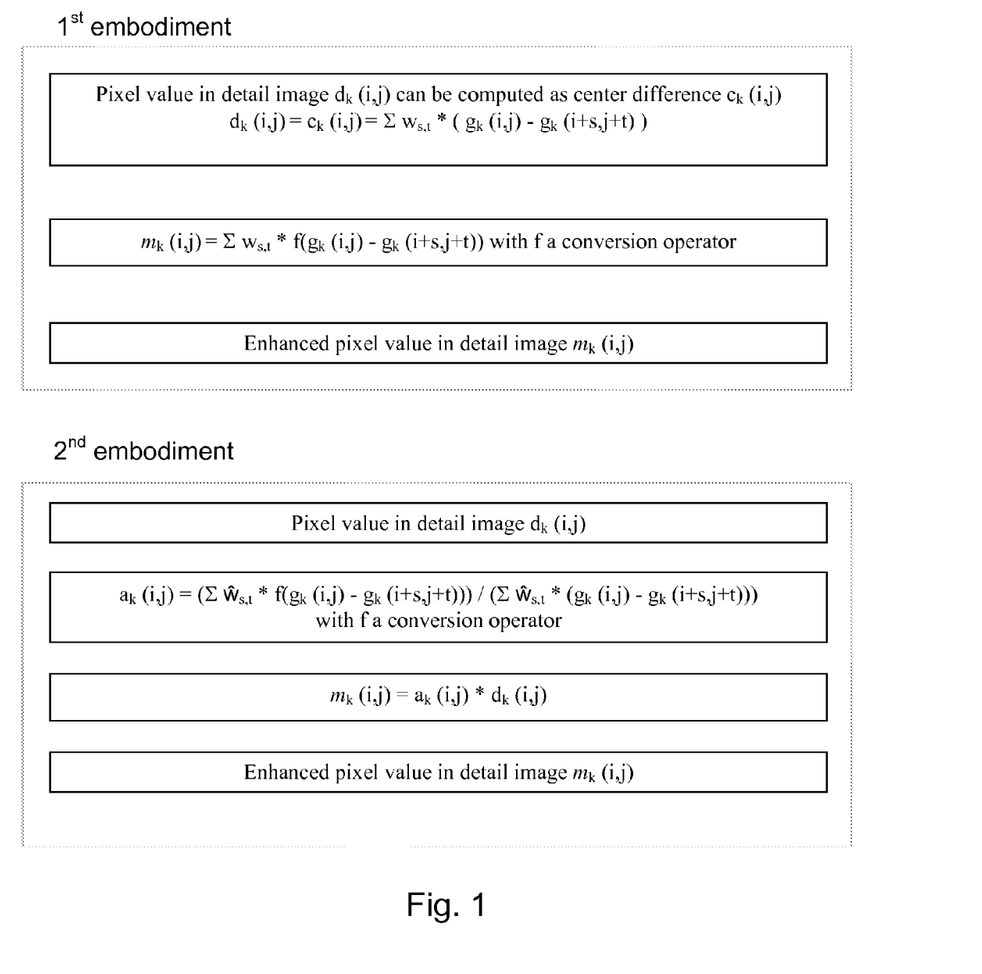
FIG. 1 schematically illustrates the steps of an embodiment of the method of the present invention.

The overall characteristics of the present invention are shown in FIG. 1.

It is applicable to the reversible multi-scale detail representation that can be computed as a weighted sum of translation difference images.

The weighing factors and the translation offsets of the translation difference images can be deducted from the multi-scale decomposition in such a way that the resulting weighted sum of the translation difference images is identical to the detail pixel values.

For these multi-scale detail representations the contrast can be enhanced by applying the conversion operator to the center differences before the weighted sum is computed.

To compute the weighted sum of translation difference images, the approximation image at the same scale (or resolution level) or the approximation images at the smaller scales (or finer resolution levels) can be used.

State-of-the-art multi-scale contrast enhancement algorithms decompose an image into a multi-scale representation comprising detail images representing detail at multiple scales and a residual image.

Some of the important multi-scale decompositions are the wavelet decomposition, the Laplacian-of-Gaussians (or LoG decomposition), the Difference-of-Gaussians (or DoG) decomposition and the Burt pyramid.

The wavelet decomposition is computed by applying a cascade of high-pass and low-pass filters followed by a subsampling step.

The high-pass filter extracts the detail information out of an approximation image at a specific scale.

In the Burt pyramid decomposition the detail information is extracted out of an approximation image at scale k by subtracting the upsampled version of the approximation image at scale k+1.

In a state of the art methods as the one disclosed in EP 527 525 a contrast enhanced version of the image is created by conversion of the pixel values in the detail images followed by multi-scale reconstruction.

All above implementations of multiscale decomposition have a common property. Each pixel value in the detail images can be computed out of an approximation image by combining the pixel values in a moving neighborhood.

In the above cases the combining function is a weighted sum.

For the wavelet decomposition the pixel values in the detail image at scale k are computed as:

$$d_{k+1} = \downarrow(h_d * g_k)$$

$$g_{k+1} = \downarrow(l_d * g_k)$$

with $h_d$ a high-pass filter, $l_d$ a low-pass filter, * the convolution operator and $\downarrow$ the subsampling operator (i.e. leaving out every second row and column).

For the wavelet reconstruction the enhanced approximation image at scale k is computed as:

$$h_k = l_r * (\uparrow h_{k+1}) + h_r * (\uparrow f(d_{k+1}))$$

with $h_r$ a high-pass filter, $l_r$ a low-pass filter and $\uparrow$ the upsampling operator (i.e. inserting pixels with value 0 in between any two rows and columns).

For the Burt decomposition the pixel values in the detail image at scale k are computed as:

$$d_k = g_k - 4g * (\uparrow g_{k+1})$$

or $$d_k = g_k - 4g * (\uparrow(\downarrow(g * g_k)))$$

or $$d_k = (l - 4g * (\uparrow(\downarrow g))) * g_k$$

with g a Gaussian low-pass filter and l the identity operator.

For the Burt reconstruction the enhanced approximation image at scale k is computed as:

$$h_k = 4g * (\uparrow h_{k+1}) + f(d_k)$$

with f(x) the conversion operator.

The multi-scale detail pixel values as weighted sums

Suppose that in the Burt multi-scale decomposition a 5×5 Gaussian filter is used with coefficients $w_{k,l}$ with k=−2, ... 2 and l=−2, ..., 2, the subsampling operator removes every second row and column and the upsampling operator inserts pixels with value 0 in between any two rows and columns.

The pixel at position i,j in the approximation image $g_{k+1}$ is computed as:

$$g_{k+1}(i,j) = \sum_{s=-2}^{2}\sum_{t=-2}^{2} w_{s,t} g_k(2i+s, 2j+t)$$

The pixel at position i,j in the upsampled image $u_k$ is computed as:

$$u_k(i,j) = \begin{cases} \sum_{s=-2}^{2}\sum_{t=-2}^{2} w_{s,t} g_k(i+s, j+t) & \text{if } i \text{ and } j \text{ are even} \\ 0 & \text{otherwise} \end{cases}$$

The pixel at position i,j in the upsampled, smoothed image $gu_k$ is computed as:

$$gu_k(i,j) =$$

$$\begin{cases} \sum_{m=\{-2,0,2\}}\sum_{n=\{-2,0,2\}} w_{m,n} \sum_{s=-2}^{2}\sum_{t=-2}^{2} w_{s,t} g_k(i+s+m, j+t+n) & \text{if } i \text{ and } j \text{ are even} \\ \sum_{m=\{-1,1\}}\sum_{n=\{-2,0,2\}} w_{m,n} \sum_{s=-2}^{2}\sum_{t=-2}^{2} w_{s,t} g_k(i+s+m, j+t+n) & \text{if } i \text{ is odd and } j \text{ is even} \\ \sum_{m=\{-2,0,2\}}\sum_{n=\{-1,1\}} w_{m,n} \sum_{s=-2}^{2}\sum_{t=-2}^{2} w_{s,t} g_k(i+s+m, j+t+n) & \text{if } i \text{ is even and } j \text{ is odd} \\ \sum_{m=\{-1,1\}}\sum_{n=\{-1,1\}} w_{m,n} \sum_{s=-2}^{2}\sum_{t=-2}^{2} w_{s,t} g_k(i+s+m, j+t+n) & \text{if } i \text{ and } j \text{ are old} \end{cases}$$

Finally, the pixel at position i,j in the detail image $d_k$ is computed as:

$$d_k(i,j) = \begin{cases} g_k(i,j) - \sum_{m=\{-2,0,2\}}\sum_{n=\{-2,0,2\}} w_{m,n} \sum_{s=-2}^{2}\sum_{t=-2}^{2} w_{s,t} g_k(i+s+m, j+t+m) & \text{if } i \text{ and } j \text{ are even} \\ g_k(i,j) - 4\sum_{m=\{-1,1\}}\sum_{\{-2,0,2\}} w_{m,n} \sum_{s=-2}^{2}\sum_{t=-2}^{2} w_{s,t} g_k(i+s+m, j+t+n) & \text{if } i \text{ is odd and } j \text{ is even} \\ g_k(i,j) - 4\sum_{m=\{-2,0,2\}}\sum_{n=\{-1,1\}} w_{m,n} \sum_{s=-2}^{2}\sum_{t=-2}^{2} w_{s,t} g_k(i+s+m, j+t+n) & \text{if } i \text{ is even and } j \text{ is odd} \\ g_k(i,j) - 4\sum_{m=\{-1,1\}}\sum_{n=\{-1,1\}} w_{m,n} \sum_{s=-2}^{2}\sum_{t=-2}^{2} w_{s,t} g_k(i+s+m, j+t+n) & \text{if } i \text{ and } j \text{ are odd} \end{cases}$$

Generally, the pixel at position i,j in the detail image $d_k$ can be computed as a weighted sum of pixels in the approximation image at the same or smaller scale k, k−1, k−2, . . . :

$$d_k(i, j) = g_l(ri, rj) - \sum_m \sum_n v_{m,n} g_l(ri + m, rj + n)$$

with $l \in \{0, \ldots, k\}$ and $r = \text{subsampling\_factor}^{(l-k)}$
Because $$\sum_m \sum_n v_{m,n} = 1$$

the pixel at position i,j in the detail image $d_k$ can be computed as:

$$d_k(i, j) = g_l(ri, rj) - \sum_m \sum_n v_{m,n} g_l(ri + m, rj + n)$$

$$d_k(i, j) = \sum_m \sum_n v_{m,n} g_l(ri, rj) - \sum_m \sum_n v_{m,n} g_l(ri + m, rj + n)$$

$$d_k(i, j) = c_k(i, j) = \sum_m \sum_n v_{m,n}(g_l(ri, rj) - g_l(ri + m, rj + n))$$

The term $g_l(ri, rj) - g_l(ri+m, rj+n)$ is called a translation difference.

It expresses the difference in pixel value between a central pixel and a neighboring pixel in an approximation image. It is a measure of local contrast.

The weighted sum of the translation differences is called a centre difference $c_k(i,j)$.

In a similar way it can be proven that the detail images in other multi-scale decomposition methods can also be represented as a combination of translation difference images.

The Conversion Operation

In state-of-the-art methods like the one disclosed in EP 527 525 contrast enhancement is obtained by applying a conversion operator f(x) to the detail image $d_k$ or, equivalently:

$$f(d_k(i, j)) = f\left(g_l(ri, rj) - \sum_m \sum_n v_{m,n} g_l(ri + m, rj + n)\right)$$

An example of such a conversion operator is the sigmoid function. Another example of such conversion operator is the contrast enhancement function like the one disclosed in EP 525 527.

The shape of the conversion operator depends on the specific requirements of the enhancement which is intended to amplify the low-value detail pixel more than the high-value detail pixels.

The conversion step may cause deformations of the shape of the edge transitions in the reconstructed, contrast enhanced image.

The reason is the non-linearity of the conversion function. Generally, the following applies to non-linear functions:

$$f(x + y) \neq f(x) + f(y)$$

or $$f\left(\sum_i x_i\right) \neq \sum_i f(x_i)$$

State-of-the-art algorithms first compute the pixel values in the detail image $d_k$ as weighted sums and apply the conversion step afterwards.

By rewriting the pixel values in the detail image $d_k$ as a weighted sum of translation differences, it is possible to apply the conversion step before the summation instead of afterwards.

Contrast enhancement is now obtained by applying the conversion step to the translation differences:

$$f(d_k(i, j)) = \sum_m \sum_n v_{m,n} f(g_l(ri, rj) - g_l(ri + m, rj + n))$$

In this way the shape of the edge transitions is better preserved in the contrast enhanced, reconstructed image.

If for every scale k the detail image at that scale is computed out of the full resolution image $g_0$, and enhancement is applied to the center differences, then the shapes of the edge transitions are best preserved after reconstruction.

Figure 5:
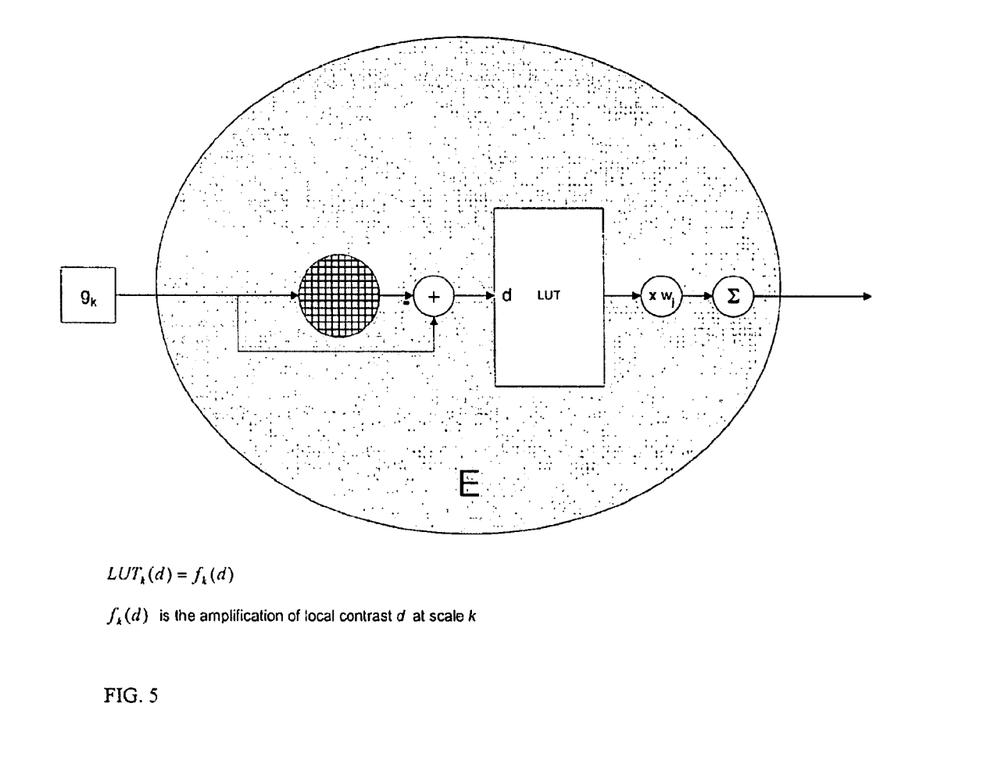
FIG. 5 illustrates the image enhancement step of the multi-resolution image processing method illustrated in FIG. 4.
Figure 6:
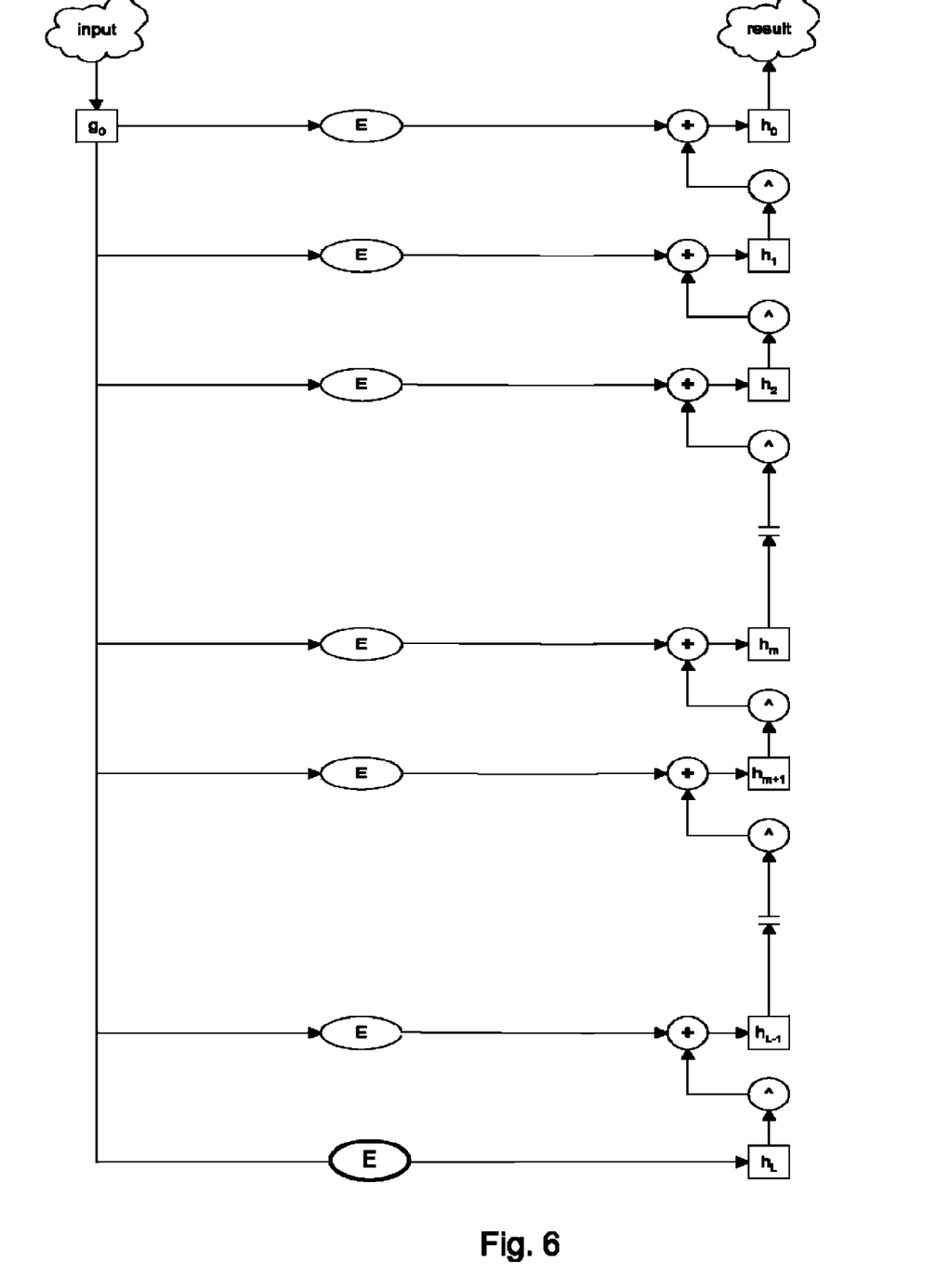
Figure 7:
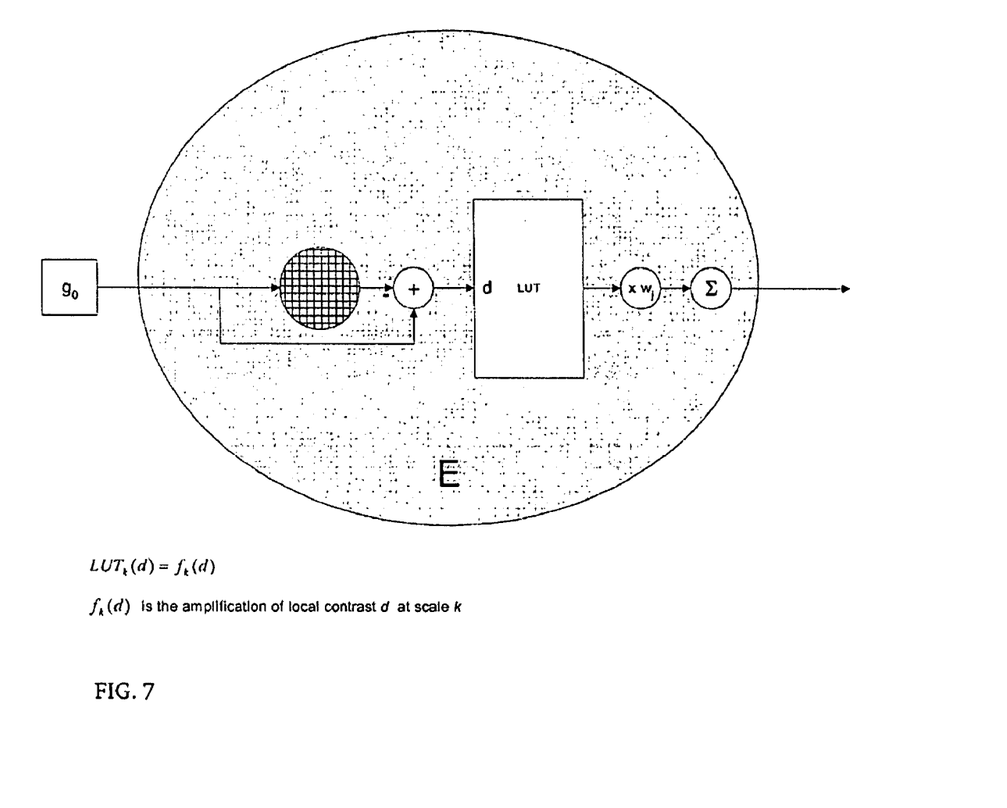
FIG. 7 illustrates the image enhancement step of the multi-resolution image processing method illustrated in FIG. 6.
Figure 8:
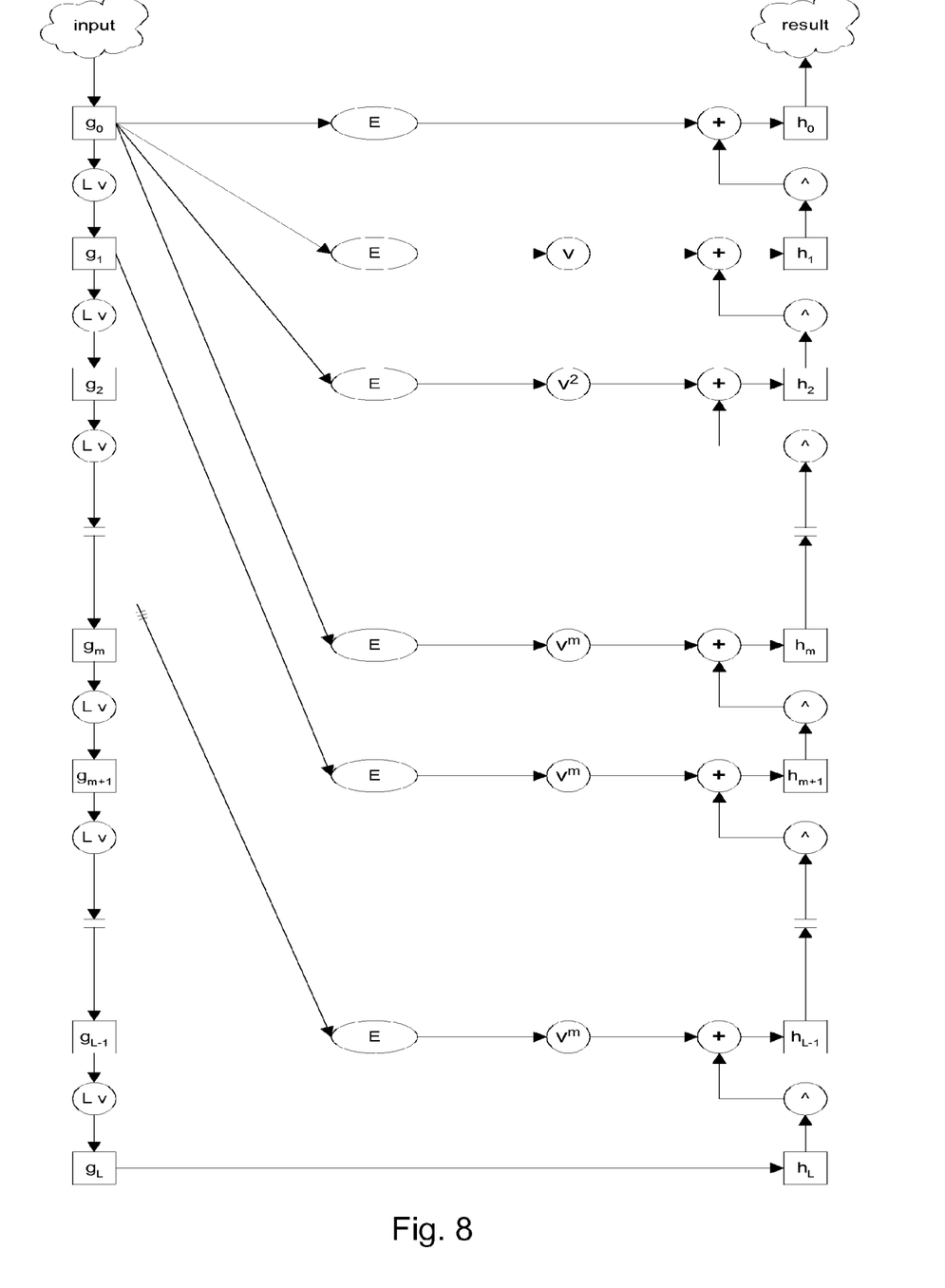
Figure 9:
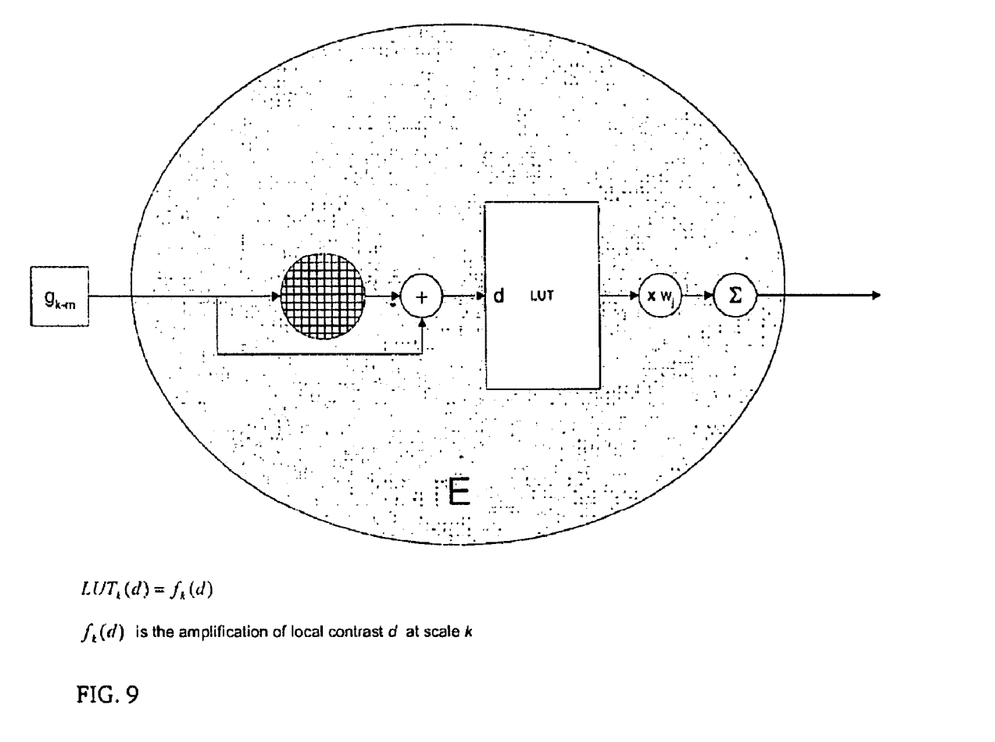
FIG. 9 illustrates the image enhancement step of the multi-resolution image processing method illustrated in FIG. 8.

Different implementations of the present invention are illustrates in FIGS. 4, 6 and 8 with the corresponding enhancement steps being illustrated in FIGS. 5, 7 and 9.

First the translation difference images are computed. This is done by subtracting a translated version of the approximation image $g_l$ from the approximation image $g_l$ itself.

The number of translation difference images and the translations needed, are defined by the spatial extent of the cascade of filters used in the multi-scale decomposition to compute a detail image at scale k out of an approximation image at scale l element of $\{0, \ldots k\}$.

For example, in case of a 5×5 Gaussian filter in the Burt decomposition and given the fact that the approximation image at the same scale as the detail image is used, 9×9=81 translation difference images are needed.

Figure 10:
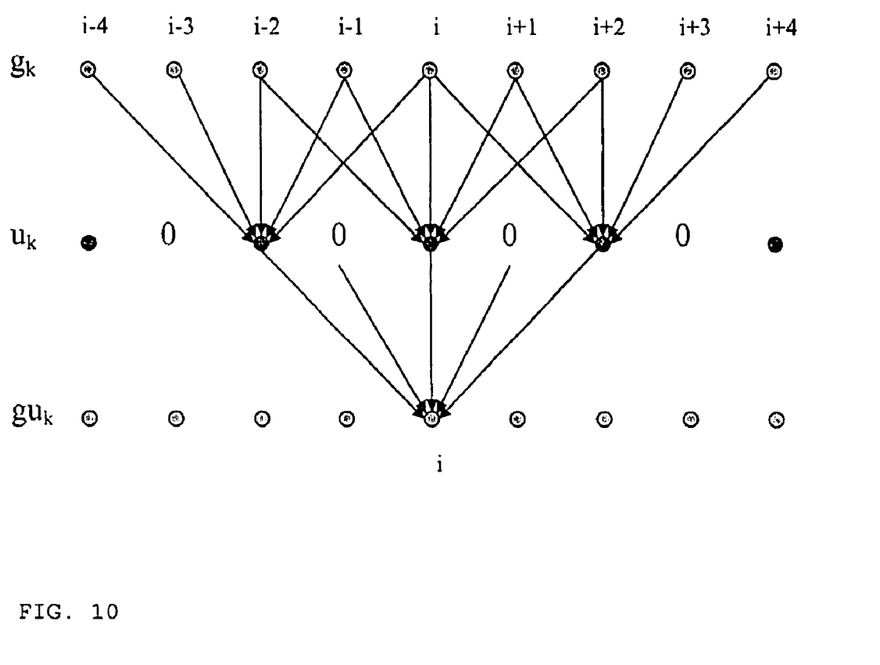
FIG. 10 illustrates the number of translation difference images and the translations needed in the method of the present invention.
Figure 11:
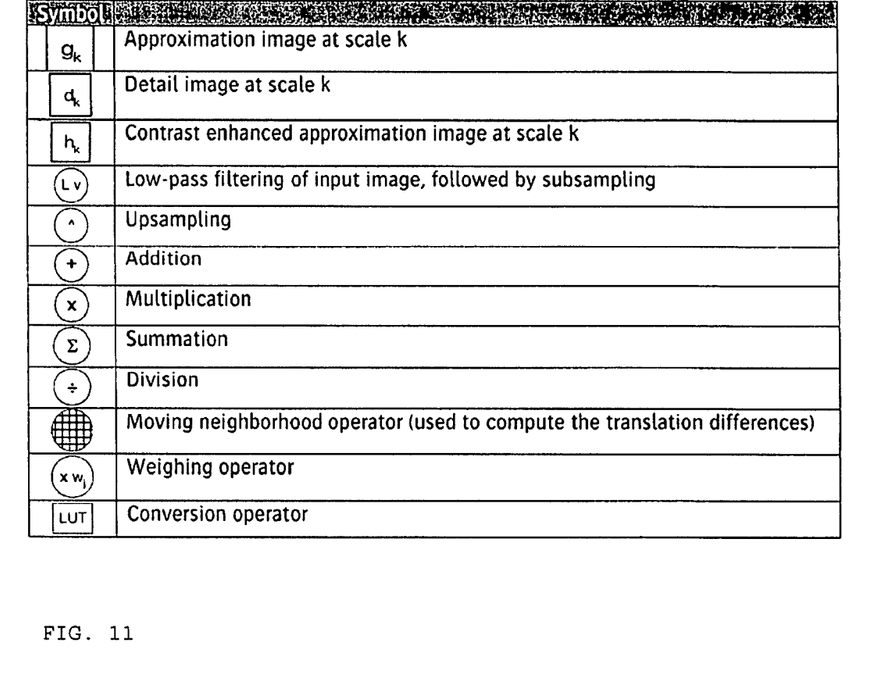
FIG. 11 is a legend pertaining to the symbols used in the above figures.

FIG. 10 schematically shows the 1D situation.

For each pixel position i,j in the detail image the weights $w_{m,n}$ are computed such that the weighted sum of the translation differences matches exactly the pixel value as would be generated by straightforward application of the Burt decomposition as described higher.

Contrast enhancement is obtained by non-linear conversion of the translation difference images.

At least one enhanced center difference image is computed as the weighted sum of the contrast enhanced translation difference images, using the weights $w_{m,n}$.

The reconstructed, contrast enhanced version of the image is computed by applying the multi-scale reconstruction to the enhanced center difference images.

The condition for the weights $w_{m,n}$ as formulated above is required for the multi-scale decomposition/reconstruction algorithm disclosed above to be reversible in case the conversion step is excluded.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of enhancing the contrast of an image that is represented by a digital signal, comprising:
    a computer creating at least one approximation image at one or multiple scales, an approximation image at a scale representing the grey values of said image in which all details at that scale have been omitted;

the computer creating translation difference images by pixel-wise subtracting the values of an approximation image at scale s and the values of a translated version of said approximation image;

the computer non-linearly modifying the values of said translation difference image;

the computer computing at least one enhanced center difference image at a specific scale by combining said modified translation difference images at that scale or a smaller scale with weights $w_{i,j}$ in which said weights $w_{i,j}$ are selected such that, if no enhancement is performed, an equivalent of a multi-scale decomposition of said image is obtained; and the computer computing an enhanced image by applying a reconstruction algorithm to the enhanced center difference images.

2. A method according to claim 1, further comprising the computer computing a translation difference image at a specific scale out of an approximation image at the same scale.

3. A method according to claim 1, wherein all of said translation difference images are computed out of the original image.

4. A method according to claim 1 wherein a translation difference image at a scale k is computed out of an approximation image at scale m, wherein m represents a scale between scale 1 and scale k−1.

5. A method according to claim 1 wherein the center difference images are identical to the multi-scale detail images.

6. A method according to claim 1 wherein said image is a mammographic image.

7. A method according to claim 1 wherein said image is a CT image.

8. A non-transitory computer-readable medium in which a computer software product is implemented, the computer software product for enhancing the contrast of an image that is represented by a digital signal, the computer software product including program instructions, which instructions, when read by a computer, cause the computer to:

create at least one approximation image at one or multiple scales, an approximation image at a scale representing the grey values of said image in which all details at that scale have been omitted;

create translation difference images by pixel-wise subtracting the values of an approximation image at scale s and the values of a translated version of said approximation image;

non-linearly modify the values of said translation difference image;

compute at least one enhanced center difference image at a specific scale by combining said modified translation difference images at that scale or a smaller scale with weights $w_{i,j}$ whereby said weights $w_{i,j}$ are selected such that, if no enhancement is performed, an equivalent of a multi-scale decomposition of said image is obtained; and compute an enhanced image by applying a reconstruction algorithm to the enhanced center difference images.

9. A non-transitory computer-readable medium in which computer software is implemented, the computer software for enhancing the contrast of an image that is represented by a digital signal, the computer software when executed by a computer, causes the computer to:

create at least one approximation image at one or multiple scales, an approximation image at a scale representing the grey values of said image in which all details at that scale have been omitted;

create translation difference images by pixel-wise subtracting the values of an approximation image at scale s and the values of a translated version of said approximation image;

non-linearly modify the values of said translation difference image;

compute at least one enhanced center difference image at a specific scale by combining said modified translation difference images at that scale or a smaller scale with weights $w_{i,j}$ whereby said weights $w_{i,j}$ are selected such that, if no enhancement is performed, an equivalent of a multi-scale decomposition of said image is obtained; and compute an enhanced image by applying a reconstruction algorithm to the enhanced center difference images.

10. A method of enhancing the contrast of an image that is represented by a digital signal, comprising:

a computer creating at least one approximation image at one or multiple scales, an approximation image at a scale representing the grey values of said image in which all details at that scale have been omitted;

the computer creating translation difference images by pixel-wise subtracting the values of an approximation image at the scale and the values of a translated version of said approximation image;

the computer modifying the values of said translation difference image;

the computer computing at least one enhanced center difference image at a specific scale by combining said modified translation difference images at that scale or a smaller scale with weights; and the computer computing an enhanced image by applying a reconstruction algorithm to the enhanced center difference images.

11. The computer software of claim 9, wherein the software, when executed by the computer, further causes the computer to compute a translation difference image at a specific scale out of an approximation image at the same scale.

12. The computer software of claim 9, wherein all of said translation difference images are computed out of the original image.

13. The computer software of claim 9, wherein a translation difference image at a scale k is computed out of an approximation image at scale m, wherein m represents a scale between scale 1 and scale k−1.

14. The computer software of claim 9, wherein the center difference images are identical to the multi-scale detail images.

15. The computer software of claim 9, wherein said image is a mammographic image.

16. The computer software of claim 9, wherein said image is a CT image.

17. A method according to claim 10, further comprising the computer computing a translation difference image at a specific scale out of an approximation image at the same scale.

18. A method according to claim 10, wherein all of said translation difference images are computed out of the original image.

19. A method according to claim 10, wherein said image is a mammographic image.

20. A method according to claim 10, wherein said image is a CT image.

* * * * *